Nov. 8, 1927.
H. D. MORTON
ELECTRIC ARC WELDING
Original Filed Jan. 27, 1917   2 Sheets-Sheet 1
1,648,560
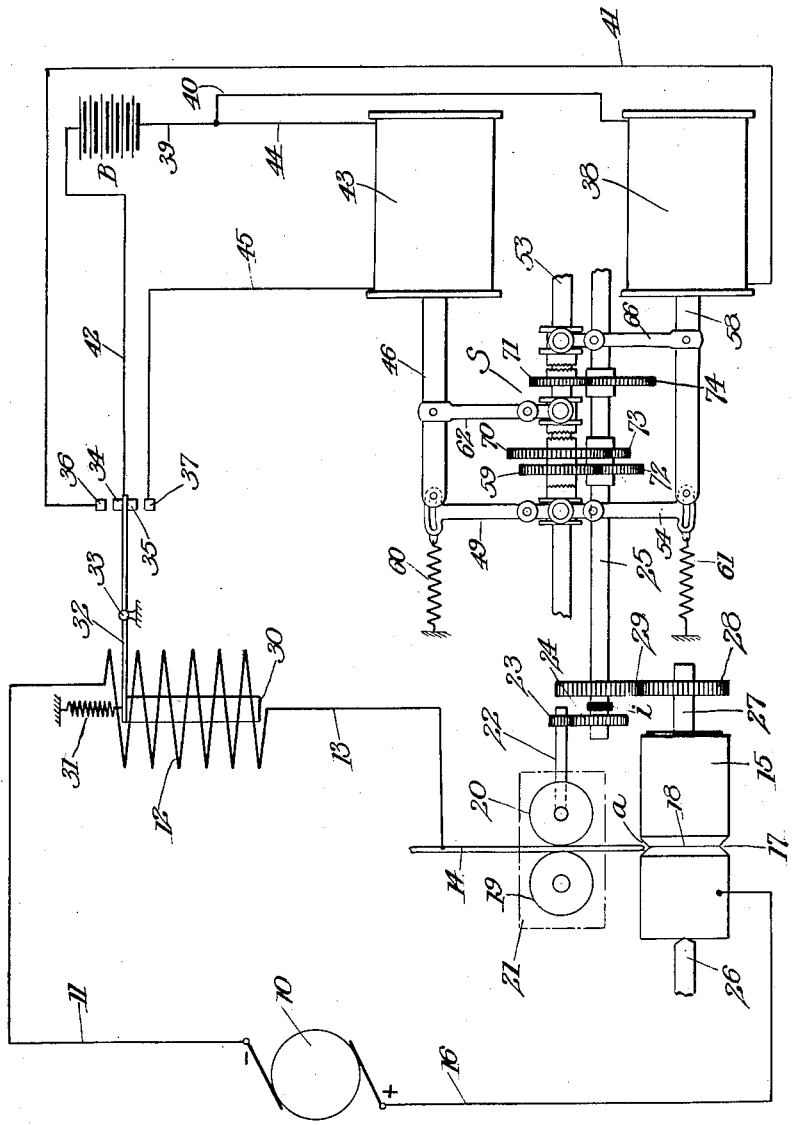

Nov. 8, 1927.
H. D. MORTON
1,648,560
ELECTRIC ARC WELDING
Original Filed Jan. 27, 1917   2 Sheets-Sheet 2
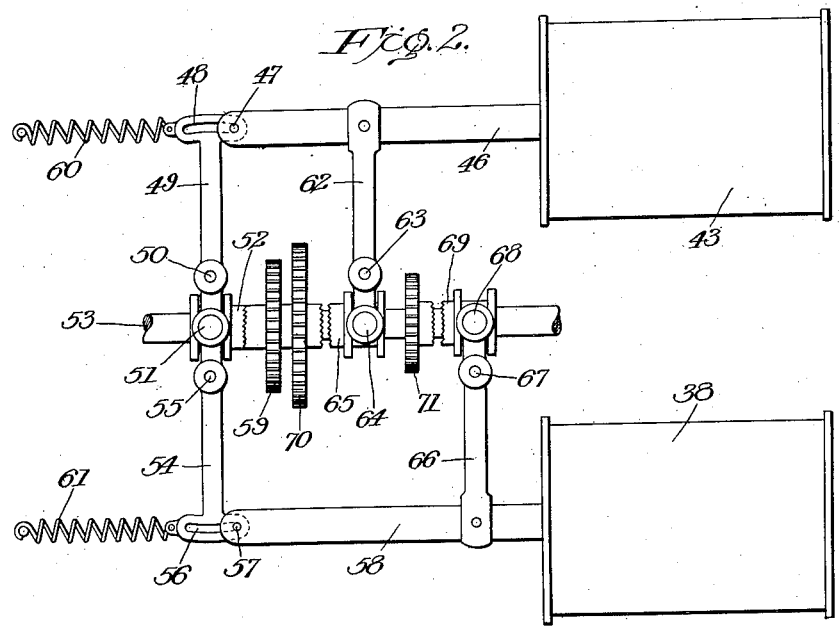
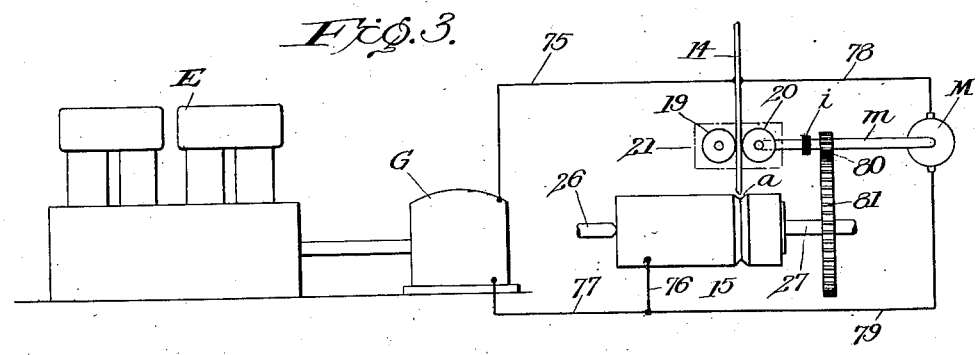
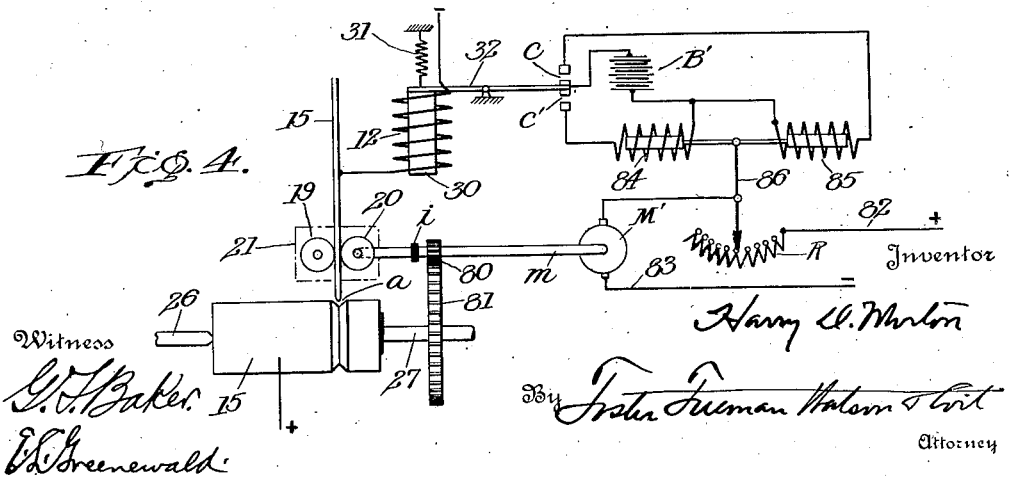

Patented Nov. 8, 1927.

1,648,560

UNITED STATES PATENT OFFICE.

HARRY D. MORTON, OF NEW YORK, N. Y., ASSIGNOR TO AUTOMATIC ARC WELDING COMPANY, OF DETROIT, MICHIGAN, A CORPORATION OF MICHIGAN.

ELECTRIC-ARC WELDING.

Application filed January 27, 1917, Serial No. 144,930. Renewed August 14, 1917. Serial No. 186,238.

My invention relates to electric arc welding in which a metallic electrode in the form of a strip or wire of welding material is fed to the arc and to the work, which constitutes the other electrode in the circuit.

I have found that it is essential for the practical successful operation of this form of electric arc welding that an equilibrium be maintained between the rate of fusing of a strip of welding material and the rate at which said welding material is fed to the arc. I have found that under some conditions and within narrow limits this equilibrium is maintained by the arc itself which has, within certain limits, if the welding strip is continuously fed at a suitable constant rate, a compensatory action as follows: When the arc shortens the resistance decreases, the amperage rises, and this rise in amperage results in the welding strip fusing more rapidly, thereby causing the arc to lengthen. Conversely, if the arc lengthens the resistance is increased, the amperage decreases proportionately, the welding strip is fused more slowly and the continuously moving welding strip restores the arc to its normal length.

While as I have stated this compensatory action of the arc may maintain the necessary equilibrium between the rate of fusing and the rate of welding strip feed, this applies only within relatively narrow limits. I have found in practice that due perhaps to differences in the fusibility or conductivity of the welding strip or of the work it frequently occurs that the range of the compensatory action of the arc is insufficient to prevent either a contacting of the welding strip with the work or a rupture of the arc due to its becoming too long.

To overcome this difficulty I have devised a method and system by means of which the equilibrium is maintained within any desired limit by controlling the rate at which the welding strip is fed to the arc or the energy supplied to the arc.

In the drawings I have disclosed several different types of metallic electrode arc welding systems by means of which my method may be carried out.

In the drawings,

Figure 1 is a diagrammatic illustration of a system embodying my invention;

Figure 2 is a view on an enlarged scale illustrating the change speed mechanism shown in connection with the system of Figure 1; and Figures 3 and 4 are diagrammatic views of other systems for carrying out my invention.

Referring to Figure 1, 10 designates an electric generator or other suitable source of current for supplying electric welding current to the welding circuit which includes the wire 11, solenoid 12, wire 13, welding strip 14, work 15 and return wire 16. It will be understood that in welding operation an arc is formed at $a$ between the end of the welding strip and the groove 17 in the work 15. For the purpose of welding two plates or parts together the ends to be joined are tapered and placed in abutting relation thereby forming the groove 17 and the intense heat of the arc at $a$ rapidly melts the metallic strip 14 and deposits it in the groove 17 thereby uniting the pieces of metal at the joint 18. On account of the fact that the intense heat at the arc $a$ melts the strip 14 very rapidly it is necessary to feed this strip from a reel to the arc uninterruptedly and automatically to produce a homogeneous weld.

The feeding mechanism for feeding the metallic welding strip 14 to the work 15 consists of two feed rollers 19 and 20, preferably provided with serrated perimeters, located to receive between them the welding strip 14 which is in the form of a wire. The feed rolls 19 and 20 are rotatably mounted in a welding head 21 which is indicated in dotted lines and provided with suitable guides for the welding strip 14. The feed rolls may be geared together and are driven by a shaft 22 connected by the gears 23 and 24 to a jack shaft 25. The work 15 in the present case consists of two cylindrical members which are to be joined by an annular weld and in order to do this the work is rotated while the welding strip 14 is being fed to the arc at $a$ and while the molten metal formed is being deposited in the groove 17. The cylindrical members constituting the work 15 are rotatably supported in some suitable manner as by the center 26 and a mandrel 27. The mandrel 27 is connected by the gear 28 to a gear 29 keyed to the shaft 25. It will be seen that by this arrangement the jack shaft 25 drives the feed rolls 19 and 20 and also produces a relative movement between the work and the welding head while the strip 14 is being fed to the work and the molten metal is being deposited on the work. It will also be noted that the feed rolls are driven at a higher speed than the work, since the ratio of the gears 23 and 24 is about as 1 to 7. The gears 28 and 29 being of the same size will cause the work 15 to be rotated at the same speed as the shaft 25. A fixed relation is preserved between the feed of the welding strip 14 and the rate of movement of the work 15 but the feed of the welding strip 14 is varied because the welding strip cannot be made uniform throughout its entire length. Different portions of the welding strip may vary in fusibility or be of slightly differing diameters and the strip will therefore fuse at different rates. When the welding strip 14 fuses very rapidly there is a danger that the arc at $a$ may suddenly become so long as to rupture and then in order to start the arc it is necessary to bring the end of the strip 14 again into contact with the work. Conversely, if the feed of the strip 14 to the arc $a$ is more rapid than the fusion of the welding strip, the welding strip may be fed against the work and cause a short circuit which is injurious to the work and also requires separating the electrodes to again form an arc.

As heretofore explained the arc $a$ has a compensatory action so that within narrow limits the differences in the fusibility of the welding strip 14 will be automatically taken care of by the arc itself. However, in order to take care of the extreme differences of fusibility of the welding strip 14 and irregularities in the contour of the work and thereby maintain the arc I have devised an automatic control mechanism which is responsive to the changes in the amperage of the arc $a$ resulting from the varying rate of melting of the welding strip and from irregularities in the contour of the work and which will alter the rate of feed of the welding strip 14 to correct the variations of the arc and thus compensate for the differences in fusibility of the feeding strip.

My arrangement for changing the rate of feed of the welding strip includes a change speed mechanism designated generally by the letter S which is actuated by the variations of the welding current flowing through the control solenoid 12. The solenoid 12 has a plunger 30, the upper end of which is connected to a spring 31, fixed at its upper end. The switch arm 32 is connected to the plunger 30 and is fulcrumed at 33. The arm 32 carries switch contacts 34 and 35 at its outer end which are normally maintained between the switch contacts 36 and 37 by reason of the fact that the spring 31 is adjusted so as to hold the plunger 30 in equilibrium in the solenoid 12 while the value of the current flowing in the welding circuit is normal. This condition prevails when the arc at $a$ is normal, that is, when the feed of the welding strip 14 is at the proper rate to keep the arc $a$ within certain predetermined limits which will produce a substantially homogeneous weld and prevent either short-circuiting of the welding strip or rupture of the arc. When an excess of current is caused to flow through the solenoid coil 12 due to the fact that the feed of the welding strip 14 is faster than its fusion, the plunger 30 will move downwardly and close the contacts 34 and 36 and energize the slow speed solenoid 38 by the following path: battery B, wire 39, wire 40, solenoid 38, wire 41, contacts 36 and 34, wire 42 back to battery B. When the slow speed solenoid 38 is energized it will cause the welding strip feeding mechanism to slow down and the normal length of arc will thereby be restored, by the speed change mechanism S to be described. On the other hand when the flow of current in the welding circuit decreases on account of the fact that a part of the welding strip 14 fuses faster than it is fed to the arc $a$, the arc $a$ will be lengthened and unless this condition is corrected the arc will rupture. The spring 31 overcomes the pull of the solenoid 12 on the plunger 30 when this condition exists and causes the contact 35 to engage the contact 37 thereby closing the local circuit which includes the high speed solenoid 43 by the following path: battery B, wires 39 and 44, high speed solenoid 43, wire 45, contacts 37 and 35, wire 42 to battery B. By energizing the high speed solenoid 43 the change speed transmission S is caused to operate to speed up the feed of the welding strip to restore the arc $a$ to its normal length.

The change speed transmission is shown to a larger scale in Figure 2 and includes the slow speed solenoid 38 and the high speed solenoid 43. The armature 46 of the high speed solenoid 43 has a pin 47 which moves in the segmental slot 48 whereby it is connected to the normal speed lever 49. The normal speed lever 49 has its fulcrum at 50 and is connected at its short end to a pin 51, which fits in the groove of a clutch 52 connected to but slidable along the drive shaft 53 which may be a line shaft or the shaft of an electric motor or other driving means. The pin 51 also has a lever 54 connected to it, the fulcrum of the latter being at 55. The long end of the lever 54 is provided with a segmental slot 56 in which a pin 57 moves and by means of which the lever 54 is connected to the armature 58 of the slow speed solenoid 38. The clutch 52 is usually held in engagement with the corresponding clutch teeth of a normal speed gear 59 by means of the springs 60 and 61 attached to the long arms of the levers 49 and 54 respectively. The armature 46 of the high speed solenoid 43 is connected to the end of a lever 62 fulcrumed at 63. The shorter end of the lever 62 carries a pin 64 which moves in a groove of the high speed clutch 65, said clutch being connected to the shaft 53 but sliding thereon. The armature 58 of the slow speed solenoid 38 is connected to a lever 66 fulcrumed at 67 and carrying a pin 68 which moves in a groove of the slow speed clutch 69, keyed to the shaft 53 but slidable thereon. The gears 59, 70 and 71 carried by the shaft 53 mesh with the gears 72, 73 and 74 keyed to the jack shaft.

When the arc lengthens the high speed solenoid 43 will be energized, attracting the armature 46, disengaging the clutch 52 from contact with the normal speed gear 59 and simultaneously causing the high speed clutch 65 to engage the clutch teeth of the high speed gear 70 which drives the shaft 25 through the gear 73 at a higher than normal speed thereby feeding the welding strip 14 more rapidly. When the circuit of the solenoid 43 is broken as the result of the arc having resumed its natural length, the spring 60 draws the armature 46 to the left, disengaging the high speed clutch 65 and reengaging the normal speed clutch 52.

When the arc shortens the circuit of the slow speed solenoid 38 is closed as already explained, causing the armature 58 to move to the right, disengaging the clutch 52 from contact with the clutch of the normal speed gear 59 and simultaneously causing the low speed clutch 69 to engage the clutch teeth of the low speed gear 71. The low speed gear 71 will then drive the jack shaft 25 at a lower than normal speed, restoring the arc to its normal length. When the circuit of the solenoid 38 is broken as a result of the arc having resumed its natural length, the spring 61 draws the armature 58 to the left, disengaging the low speed clutch 69 and reengaging the normal speed clutch 52.

It will be noted that the three clutches on the drive shaft 53 are interlocking, i. e. but one can be engaged at a time, the other two being held automatically out of contact. When either lever 49 or lever 54 acts to disengage the clutch 52 there is a movement of the opposite lever but this movement does not affect the opposite armature with its high speed or low speed lever (as the case may be), for the reason that the segment of such opposite lever moves in the slotted portion of its armature, such armature remaining stationary.

It is to be understood that the system shown in Figure 1 is merely illustrative and that the well-known arc-starting devices, ballistic resistances, reactances, and manipulating means such as switches, etc., common in the art, are omitted and that numerous other systems may be employed for carrying out the same method and obtaining the same results. For instance, instead of the wire feed rolls 19 and 20 being driven by a line shaft as shown in Figure 1, they may be driven by an electric motor M (Figure 3), which motor derives its current by wires 75, 78 and 77, 79 from an electric generator G driven by a gasoline engine E, which generator also supplies the welding current through the following circuit; wire 75, welding strip 14, across arc $a$, work 15, wires 76 and 77 to generator G.

In this system my method would be carried out in the following manner: As the arc at $a$ shortens its resistance decreases, the amperage increases and as this amperage represents the load upon the prime mover, i. e. the gasoline engine E, the speed of such prime mover will be decreased. This decrease in speed will, of course, result in a corresponding decrease in the speed of the electric generator G driven by said prime mover. This decrease in generator speed results in the lowering of the generator voltage. As the motor M which drives the feed rolls derives its current from the generator G it will be affected by the drop in generator voltage and its speed and consequently the rate of the welding strip feed will be reduced. This decrease in the rate of the welding strip feed will result in the arc being gradually restored to its normal length. This will reduce the load upon the prime mover E, allowing its speed to become normal, restoring the normal speed and voltage of the generator G and consequently of the motor M and of the rate of the welding strip feed.

Conversely, if the arc becomes too long its resistance increases, the amperage decreases, the load on the prime mover E decreases, causing the speed of the gasoline engine E together with that of the generator G to increase. This increase in generator speed causes a corresponding increase in generator voltage which results in motor M running at a higher speed, feeding the welding strip 14 to the arc more rapidly and gradually restoring the arc to its normal length. Thereupon the prime mover E regains its normal speed, the generator G its normal voltage and the equilibrium between the rate of welding strip feed and the rate of fusing is restored.

It will be obvious that a steam engine may be employed as a prime mover instead of a gasoline engine E in the system shown in Figure 3 and the same results will be obtained. Also a series wound electric motor may be substituted as a driving means for the generator G. In fact, so long as the rolls feeding the welding strip are driven by a motor deriving its current from a generator supplying welding current and driven by any source of power sufficiently responsive in rate of speed to variations in load, i. e. variations in amperage of the arc, my method will be operative.

Further, my method is operable under the following conditions. Referring to Figure 4, motor M' may derive its current from a source 82, 83 independent of the source of the welding current. In this case the control solenoid switches C and C' operate local low voltage circuits of solenoids 84 and 85 which control the operation of the pivoted arm 86 of rheostat resistance R in series with motor M' operating the welding strip feed mechanism, thereby varying the rate of the motor speed and of welding strip feed to maintain the equilibrium between the rate of welding strip feed and the rate of fusing.

In Figures 3 and 4, the gears 80 and 81 which rotate the work 15 from the motor shaft m serve to cause the work 15 and welding head 21 to have a movement relative to each other while the welding strip 14 is being fed to the arc unintermittently. The molten metal is thereby deposited on the work continuously producing a homogeneous weld.

It is to be understood that when the contour of the work varies, it is necessary to vary the relation between the fusing rate and the feeding rate of the strip. For instance, if an elevation or protuberance in the work is encountered, it then becomes necessary to fuse the strip faster than it is fed. On the other hand, if a depression in the work is encountered, it becomes necessary to feed the strip faster than it is fused.

By the term "a characteristic of the arc" as used in the claims, I intend to include such variable, utilizable properties as accompany the operation of an arc, and which are indicative of its normal or abnormal operation, such, for example, as its current voltage, resistance, length, or energy absorption.

My invention therefore embodies means for correctively increasing the feeding rate of the welding strip when the arc lengthens and for correctively decreasing said feeding rate when the arc shortens. By the reference in some of the appended claims to "varying the speed of the feeding means either side of normal," "varying the arc length either side of normal," and other like expressions, I intend to be understood that such variations are both above and below the normal speed or above and below the normal arc length, i. e. on both sides of such normal speed or on both sides of such normal arc length.

Having thus described my invention what I claim and desire to secure by Letters Patent is:

1. The method of electric arc welding which consists in applying to work material constituting one electrode molten metal derived from another electrode continuously fed toward the work material, and regulating the arc either side of normal by changing the speed of the feeding mechanism under control of a variable characteristic of the arc.

2. The method of electric arc welding which consists in applying molten metal derived from one of the electrodes fed toward the other, and regulating the arc by automatically changing the speed of the feeding mechanism above and below the normal speed under control of a variable characteristic of the arc.

3. The method of metallic electrode arc welding which consists in feeding an electrode constituting a welding strip to the work, and compensating for variations in the length of the arc outside a predetermined range by changing the speed of the feeding means above and below the normal speed under control of resulting changes in a characteristic of the arc.

4. The method of electric arc welding which consists in continuously feeding one electrode constituting a welding pencil to the work constituting the other electrode and restoring the arc to normal length upon an increase in arc length by automatically varying the speed of the feeding means.

5. The improvement in that process of electric arc welding in which a metallic welding strip is continuously fed to the arc throughout the welding operation, which consists in maintaining the arc by causing arc variations to correctively alter the speed of the feeding means.

6. The method of electric arc welding which consists in continuously feeding one of the electrodes constituting a welding pencil to the other electrode constituting work material and automatically controlling the feeding rate above and below the average rate by the effect of a variable characteristic of the arc to maintain the arc length substantially constant.

7. The method of electric arc welding wherein an arc is adapted to be struck between the work and a welding pencil which consists in continuously feeding the welding pencil to maintain the arc and producing variations in the speed of the continuous feeding means by changes in an electrical characteristic of the welding circuit.

8. The improvement in the method of electric arc welding in which a metallic welding strip is continuously fed toward the work and relative movement is effected between the strip-feeding means and the work, which consists in automatically compensating for changes in the arc length due to elevations and depressions in the contour of the work by automatically varying the speed of the continuous feeding means to maintain the arc length substantially constant.

9. The method of electric arc welding which consists in feeding one electrode constituting a welding pencil toward the work constituting the other electrode and automatically maintaining a substantially constant arc length by utilizing a variable characteristic of the welding circuit to correctively alter the speed of the feeding means above and below the normal rate.

10. The method of metallic electrode arc welding which consists in continuously feeding a welding strip to the work, and controlling the speed of the feeding means by a variable characteristic of the arc to cause the welding strip to feed slower than it is fused when the arc shortens, and to feed faster than it is fused when the arc lengthens.

11. The improvement in that method of electric welding wherein an arc is struck between a welding pencil and the work to be welded which consists in preventing rupture of the arc by feeding the pencil toward the work and by causing a lengthening of the arc to increase the speed of the feeding means above the normal speed.

12. A method of welding metals by the use of an electric arc consisting in varying the rate of feed of the welding electrode and of the seam to be welded directly with the changes in the length of the electric arc.

13. The method of utilizing the heat of the electric arc for producing circumferential welds in substantially cylindrical work, constituting one electrode, which consists in automatically feeding another electrode to an arc struck between said electrodes, such feeding being at the proper rate to maintain the arc length substantially constant, and rotating the work while the arc is maintained.

14. In electric arc welding, means for feeding a welding pencil to the work and automatic means for regulating the speed of the feeding means either side of normal.

15. In a metallic electrode arc welding machine, the combination of a welding head, a metallic welding strip constituting one electrode, the work constituting the other electrode, means for feeding said strip from the welding head toward the work, means for moving said head and work relatively to each other while molten metal is being deposited upon the work, and automatic means for controlling the speed of the feeding means either side of normal to maintain the arc length substantially constant.

16. In a metallic electrode electric arc welding machine in which a welding strip constitutes one electrode and the work constitutes the other electrode, the combination of a welding strip carrier, means for effecting relative movement between the work and the welding strip carrier, means for feeding said welding strip from the carrier toward the work whereby molten metal is deposited on the work while the carrier and work are moving relatively to each other, and means for causing a characteristic of the arc to control the speed of the feeding means above and below the normal speed.

17. In an electric arc welding machine, means comprising a gripping device for feeding a welding pencil to the work and automatically acting means for controlling the speed of the gripping device either side of normal.

18. In electric arc welding, a welding pencil, rotary means for gripping and feeding said pencil, and automatic means for accelerating the normal speed of the gripping and feeding means to maintain the arc length substantially constant.

19. In an arc welding machine, means comprising feed rolls for feeding a welding pencil and automatic means for varying the speed of said feed rolls either side of normal in order to maintain a substantially constant arc length.

20. In an arc welding machine, means comprising feed rolls for feeding a welding strip toward the work, and means responsive to a variable characteristic of the welding circuit for regulating the arc length by varying the speed of said feed rolls both sides of normal.

21. An arc welding machine, comprising a fusible electrode co-operating with the welding joint to strike an arc at said joint, mechanism for feeding said electrode, means for progressively presenting said joint to said electrode, and means controlled by a characteristic of the welding circuit for controlling the speed of progression of said joint.

22. An apparatus for producing circumferential welds in substantially cylindrical work by means of the electric arc, wherein the arc is maintained between the work and a metallic electrode, characterized by the fact that means are provided to feed the electrode to the arc automatically at the proper rate to maintain the length of the arc substantially constant, and by the fact that means are provided to rotate the work while the welding arc is maintained.

23. In electric arc welding, a welding pencil, a continuous forward feed mechanism for moving the pencil to the work being welded, and means for controlling the speed of said mechanism either side of normal in positive relation to the melting of the pencil.

24. In electric arc welding, a welding circuit including work material and a welding pencil, means for continuously feeding said pencil to the work material and means controlled by a characteristic of the welding circuit for varying the speed of the feeding means to maintain a constant length of arc between said pencil and the work being welded.

25. In electric arc welding, a welding pencil, work material and electro-responsive means for continuously feeding the supply metal from the pencil to the work material 26. In electric arc welding, a welding circuit including a welding pencil and work material, a continuous forward feed mechanism for moving the pencil to the work material, and means responsive to a characteristic of the welding circuit for controlling the speed of said mechanism to maintain the arc length substantially constant.

27. In electric arc welding, a welding circuit, a welding pencil and work material included in said circuit, and means controlled by a characteristic of said circuit for continuously feeding the pencil to an arc struck between said pencil and work material in order to maintain the arc length substantially constant.

28. In electric arc welding, a welding pencil, work material and electro-responsive means for continuously feeding the pencil to the work material at correctively varying rates.

29. In an arc welding machine, means for continuously feeding a welding pencil to the work and means controlled by a variable characteristic of the arc for varying the speed of the feeding means above and below the average speed in order to maintain a substantially constant arc length.

30. An automatic arc welding system comprising a source of welding energy, means adapted continuously to feed an arc welding electrode to maintain a welding arc, and a regulating device responsive to variations of an electrical characteristic of the welding energy for varying the speed of the feeding means to maintain the arc at substantially constant length.

31. In an arc welding machine, means for continuously feeding a welding pencil to the work and automatic means operating upon a departure in either direction from normal arc length for varying the speed of the feeding means to restore the arc length to normal.

32. In an automatic arc welding machine, means for continuously feeding a welding pencil to the work and means responsive to an electrical characteristic of the arc for varying the speed of the feeding means in order to regulate the arc length either side of normal.

33. In a metallic electrode electrical arc welding machine in which the work constitutes one electrode and a welding strip the other electrode, the combination of means for effecting continuous feed of the welding strip, and means controlled by the effect of a characteristic of the arc for varying the speed of the feeding means to maintain the length of the arc substantially constant.

34. In electric arc welding wherein an arc is struck between the work constituting one electrode and a welding pencil constituting the other electrode, a welding head, automatic means for forwardly feeding the welding pencil from said head at a plurality of continuous speeds, and automatic means for regulating the arc length either side of normal.

35. In a metallic electrode arc welding machine, the combination of a welding pencil constituting one electrode, means operative to continuously feed said pencil to an arc between the pencil and the work, the latter constituting the other electrode, and means conrolled by a variable characteristic of the welding circuit for imparting a plurality of speeds to said continuously operative feeding means in order to correct for changes in arc length.

36. In an arc welding machine, means comprising feed rolls for continuously feeding a welding strip toward the work, and automatic means for regulating the arc by varying the speed of said feed rolls either side of normal to maintain the arc length substantially constant.

37. In electric arc welding, continuously rotating rolls gripping a welding pencil to feed it to the work and means controlled by a characteristic of the welding circuit for correctively varying the speed of rotation of said rolls.

38. In electric arc welding, a welding circuit, electrodes in said circuit, means for gripping one electrode and imparting movement thereto relative to said gripping means to continually feed it toward the other electrode, and means responsive to an electrical characteristic of the welding circuit for varying the speed of the feeding means to maintain the arc length substantially constant.

39. In electric arc welding wherein an arc is adapted to be struck between a welding pencil and work material, the combination of a continuous forward feed mechanism for moving the pencil to the arc and means responsive to an electrical characteristic of the arc for correctively accelerating and decelerating the speed of said continuous feed mechanism to maintain the arc length substantially constant.

40. In electrode arc welding, a welding circuit, the work constituting one electrode, a welding pencil constituting the other electrode, and welding pencil feeding means responsive in speed to a variable electrical characteristic of the welding circuit whereby when the arc shortens the welding pencil is fed continuously and more slowing than it fuses, and when the arc lengthens said pencil is fed continuously and more rapidly than it fuses.

41. In electrical arc welding wherein an arc is adapted to be struck between a fusible pencil constituting one electrode and work material constituting the other electrode, means for continuously feeding said pencil to said arc and means controlled by a characteristic of the welding circuit to so increase the rate of said continuous feed when the arc lengthens that the pencil will be temporarily fed more rapidly than it is fused, and to so decrease the rate of said continuous feed when the arc shortens that the pencil will be temporarily fed more slowly than it is fused.

42. In a metallic electrode arc welding machine, the combination of a metallic welding strip constituting one electrode, automatic means for continuously feeding said strip to the arc between the strip and the work, the latter constituting the other electrode, automatic means for moving said work relatively to the strip, and auomatically acting means for controlling the speed of the feeding means to maintain the arc length substantially constant.

43. In a metallic electrode arc welding machine, the combination of a welding head, a metallic welding strip constituting one electrode, the work constituting the other electrode, means responsive to an electrical characteristic of the arc for continuously feeding said strip from the welding head to the arc, means for moving said head and work relatively to each other while molten metal is being deposited upon the work, and means for controlling the rate above and below the normal rate of feeding the strip to maintain the arc length substantially constant.

44. In electric arc welding, a motor for continuously feeding a welding pencil to the work, and a regulator responsive to changes in arc length for varying the speed of said motor to maintain the arc.

45. In electric arc welding, the combination of a welding circuit including a welding strip and work material between which an arc is adapted to be struck, means for automatically feeding said welding strip to said arc, driving means for the feeding means, means independent of the welding circuit for actuating the driving means and means associated with the welding circuit for controlling the actuating means to maintain the arc.

46. In electric arc welding, the combination of a welding circuit including a welding strip and work material between which an arc is adapted to be struck, means for feeding said welding strip to said arc, means for actuating said feeding means, an independent electric circuit for energizing said actuating means, and means responsive to conditions in said welding circuit for controlling said independent circuit to maintain the arc.

47. In electric arc welding, the combination of a welding circuit including a welding strip and work material between which an arc is adapted to be struck, means for automatically feeding said welding strip to said arc, means energized from a circuit independent of said welding circuit for actuating said feeding means, and means responsive to conditions in said welding circuit for controlling said independent circuit to maintain the arc.

48. In an arc welding apparatus, the combination of means for continuously feeding a metallic strip toward the work, means for supplying welding current to the arc, means independent of said supply means and of the welding circuit for actuating said welding-strip feeding means, and means for regulating the arc by automatically varying the speed of said continuous feeding means above and below the normal speed to maintain the arc length substantially constant.

49. In an electric arc welding machine in which a welding strip constitutes one electrode and the work constitutes the other electrode, the combination of a generator supplying current to the welding circuit, means for feeding the welding strip toward the work, said means being actuated by an electric motor deriving its current from a source independent of the welding generator, and electro-magnetic resistance varying means, responsive to variations in the arc and acting upon the circuit of the motor to vary its speed and the rate of the welding strip feed in order to maintain the arc.

50. In electric arc welding wherein an arc is struck between the work and a welding pencil, a motor for continuously feeding a welding pencil toward the work, and automatic means for varying the speed of said motor to regulate the arc.

51. An apparatus for metallic arc welding of the type wherein the welding arc is maintained between the work and a metallic electrode, and wherein electrode feeding mechanism is arranged to be operated to feed the electrode to maintain the arc. and wherein a variable speed dynamo electric machine is arranged to operate said feeding mechanism, characterized by the fact that the speed of said dynamo electric machine is automatically controlled in accordance with an electrical characteristic of the arc which varies with the arc length.

52. An automatic arc welding system, comprising a welding circuit containing the work and a metallic electrode, feeding mechanism arranged to be operated to feed the electrode to maintain the arc, a variable speed dynamo electric machine arranged to operate said feeding mechanism, connections arranged to control the speed of said dynamo electric machine in accordance with an electrical characteristic of the welding circuit, whereby the rate at which the electrode is fed is regulated to maintain the voltage across the arc substantially constant.

53. An arc welding machine, comprising means for maintaining the welding arc, a motor, means for moving the work in the direction of the welding joint, a fusible electrode, means for feeding said fusible electrode, the said feeding and work-moving means being driven by said motor, and means controlled by variations in a characteristic of the welding circuit for controlling the speed of said motor.

54. In an arc welding apparatus, a welding circuit including an arc, means for supplying electric energy to the arc, means actuated independently of the welding circuit for continuously feeding the welding strip toward the work, and means responsive to an electrical characteristic of the welding circuit for maintaining the arc length substantially constant.

55. In an electric arc welding machine, the combination of a welding strip and work material, means independent of the welding circuit for continuously feeding the welding strip towards the work, and arc regulating means for correctively varying the speed of said feeding means to maintain the arc length substantially constant.

56. In an electric arc welding machine wherein an arc is struck between the work constituting one electrode and a welding pencil constituting the other electrode, means for continuously feeding the welding pencil and means responsive to changes in welding current for controlling the speed of the feeding means above and below the average rate of speed to maintain the arc length substantially constant.

57. In apparatus for continuous electric arc welding, work material constituting one electrode, a fusible metallic pencil constituting the other electrode, means to grip said electrode and continuously feed the same toward the work, circuit connections for passing the other electrode, means to grip said electrode and work, and devices governed by the fusing current to automatically control the speed of said electrode feeding means so that the rate of feeding of said electrode will be in accordance with the variations in the fusing current.

58. In electric arc welding wherein a welding pencil constitutes one electrode and the work constitutes the other electrode, welding-pencil feeding means and a relay responsive to conditions in the welding circuit for governing said feeding means to maintain the arc.

59. In electric arc welding wherein a welding pencil constitutes one electrode and the work to be welded constitutes the other electrode, the combination of a welding circuit, a relay controlled by said circuit, and means controlled by said relay for maintaining a substantially constant arc length between said electrodes.

60. In electric arc welding wherein a welding pencil constitutes one electrode and the work to be welded constitutes the other electrode, a welding circuit including said electrodes, a relay responsive to conditions in said circuit, and means controlled by said relay for maintaining a substantially constant arc length between said electrodes.

61. In electric arc welding wherein an arc is adapted to be struck between a welding pencil and work material, and wherein relative movement is effected between said pencil and work material, the combination of a welding circuit including said pencil and work material, a relay responsive to conditions in said circuit, and means controlled by the relay for governing the rate of said relative movement to maintain the arc.

62. In electric arc welding, the combination of a welding circuit including a welding pencil and work material, welding-pencil feeding means, control means for the feeding means, and electro-responsive means governed by the control means for increasing the feeding rate when the arc lengthens and for decreasing the feeding rate when the arc shortens.

63. In electric arc welding, the combination of a welding circuit including a welding pencil and work material, welding-pencil feeding means, control means responsive to a characteristic of the welding circuit, and electro-responsive means governed by the control means for regulating the speed of the feeding means to maintain the arc.

64. In electric arc welding wherein an arc is struck between a welding pencil and work material, an electro-responsive device controlled by the welding circuit and a second electro-responsive device controlled by said first electro-responsive device for regulating the arc to maintain the same.

65. In electric arc welding wherein an arc is adapted to be struck between work material constituting one electrode and a welding pencil constituting the other electrode, an electric circuit including said work material and pencil, a relay controlled by conditions in said circuit, and means controlled by said relay for regulating the arc to maintain the same.

66. In electric arc welding, the combination of a welding circuit wherein a metallic arc is struck, means responsive to variations in said circuit for maintaining said arc, a plurality of work pieces fusible by the heat of said arc, and automatic means for effecting relative movement between said arc and work pieces in order to circumferentially weld together said work pieces.

In testimony whereof I affix my signature.

HARRY D. MORTON.